United States Patent
Kuster et al.

(10) Patent No.: US 11,193,605 B1
(45) Date of Patent: Dec. 7, 2021

(54) HOT WATER RECIRCULATION VALVE

(71) Applicants: Hans L. Kuster, Barrington, RI (US); Michael McNamara, Coventry, RI (US); John Papa, Warwick, RI (US)

(72) Inventors: Hans L. Kuster, Barrington, RI (US); Michael McNamara, Coventry, RI (US); John Papa, Warwick, RI (US)

(73) Assignee: AquaMotion, Inc., Barrington, RI (US)

(*) Notice: Subject to any disclaimer, the term of this patent is extended or adjusted under 35 U.S.C. 154(b) by 345 days.

(21) Appl. No.: 16/430,925

(22) Filed: Jun. 4, 2019

Related U.S. Application Data (60) Provisional application No. 62/750,494, filed on Oct. 25, 2018.

(51) Int. Cl.
| | |
|---|---|
| *F16K 21/00* | (2006.01) |
| *F24D 17/00* | (2006.01) |
| *G05D 23/02* | (2006.01) |
| *F16K 31/00* | (2006.01) |
| *F16K 11/00* | (2006.01) |

(52) U.S. Cl.
CPC .......... *F16K 31/002* (2013.01); *F16K 19/006* (2013.01); *F24D 17/0078* (2013.01); *G05D 23/02* (2013.01); *F24D 2220/0257* (2013.01)

(58) Field of Classification Search
CPC .... F16K 31/00; F16K 19/006; F24D 17/0028; F24D 2220/0257; G05D 23/02
See application file for complete search history.

(56) References Cited

U.S. PATENT DOCUMENTS

| | | | | |
|---|---|---|---|---|
| 2,842,155 | A * | 7/1958 | Peters | G05D 23/1333 137/337 |
| 5,205,318 | A * | 4/1993 | Massaro | F24D 17/0078 122/13.3 |
| 5,572,985 | A * | 11/1996 | Benham | F24D 17/0078 122/13.3 |
| 8,083,500 | B1 | 12/2011 | Lebkuchner et al. | |
| 8,303,184 | B1 | 11/2012 | Lebkuchner et al. | |
| 8,434,510 | B2 * | 5/2013 | Lum | F16K 31/002 137/337 |
| 9,328,736 | B2 | 5/2016 | Lebkuchner et al. | |

(Continued)

*Primary Examiner* — Marc E Norman
(74) *Attorney, Agent, or Firm* — Salter & Michaelson (57) ABSTRACT

A recirculation valve for use with a tankless water heater in a system that includes hot and cold water fixtures and a cold water supply. The recirculation valve includes a valve body having an inlet connection, a pair of outlet connections and an internal chamber; a thermostatic element that is disposed in a first portion of the internal chamber of the valve body and includes an actuation body that is responsive to water temperature; wherein the valve body further has a port opening that is disposed between the thermostatic element and a second portion of the internal chamber; wherein the thermostatic element further includes a piston constructed and arranged to operatively extend from said actuation body when the actuation body is heated, and a plunger that is carried by and is moveably responsive to the actuation body; and whereby, when the actuation body is heated, the valve transitions from an open position to a closed position by the piston moving the actuation body and plunger so that the plunger moves to seal against the port opening of the valve body.

10 Claims, 5 Drawing Sheets

(56) References Cited

U.S. PATENT DOCUMENTS

| | | |
|---|---|---|
| 9,863,647 B1 | 1/2018 | McNamara et al. |
| 9,879,796 B2 | 1/2018 | Tallos et al. |
| D834,145 S | 11/2018 | McNamara et al. |

* cited by examiner

HOT WATER RECIRCULATION VALVE

RELATED CASE

Priority for this application is hereby claimed under 35 U.S.C. § 119(e) to commonly owned and U.S. Provisional Patent Application No. 62/750,494 which was filed on Oct. 25, 2018 and which is incorporated by reference herein in its entirety.

FIELD OF INVENTION

The present invention relates in general to an improved hot water recirculation valve. The present invention also pertains to a hot water recirculation valve that is particularly for tankless on-demand and continuous supply applications. The present invention also relates to a novel valve construction using a thermostatic element that allows sufficient flow to activate a tankless hot water heater when hot water is called for by an end user (home owner) at a point of use, and/or to maintain hot water at the point of use, using the cold water supply line as the return for the cooling hot water.

BACKGROUND

Due to expanding populations and unpredictable weather patterns that can result in droughts, potable water has become a resource that needs to be conserved and not wasted. Many municipalities have enacted new plumbing codes which require that homes have hot water recirculation systems to save water. This has resulted in the development of many different systems or apparatus to accomplish this goal. Specific code requirements such as temperature limits, time limitations, and "On Demand" (On Call) rules place restrictions on how these codes are addressed. In addition to code requirements the market for hot water heaters has been transitioning to tankless heaters to address new energy saving codes as well. Tankless heaters have their own operational requirements that differ from traditional hot water tanks. Tankless heaters require minimum flow rates to activate (heat) and the maximum flows are limited by the resistance through their heat exchangers and the pressure available to drive the flow.

Currently tankless heaters require separate heating tanks or bypass loops between the tankless heater water supply and the tankless heater's discharge to establish or to maintain sufficient flow to activate the tankless heater and to supply or maintain hot water at the point of use. These existing systems result in additional plumbing, space usage and cost. Additionally, if a code requires that the system be activated by the end user "On Demand" (On Call) the system must maintain enough flow to keep the tankless heater activated long enough for the hot water to reach the point of use and to shut off completely when the desired temperature is obtained at the point of use.

Accordingly, there is a need in the field for an approach that is able to address both the current liabilities of the approaches available today and to meet the "On Call" code requirements.

Accordingly, it is an object of the present invention to provide an improved hot water recirculation valve.

Another object of the present invention is to provide a hot water recirculation valve that is particularly for tankless on-demand and continuous supply applications.

Still another object of the present invention is to provide a novel valve construction using a thermostatic element that allows sufficient flow to activate a tankless hot water heater when hot water is called for by an end user (home owner) at a point of use, and/or to maintain hot water at the point of use, using the cold water supply line as the return for the cooling hot water.

SUMMARY OF THE INVENTION

The present invention comprises a novel valve that combines a thermostatic element that controls both flow and temperature of the hot water supplied at the point of use and which mounts directly to the angle stop at the point of use fixture and a technique to attach a specialized fitting mounted on the other angle stop to the inlet of the valve body. The improved valve construction is such that a minimum flows through the valve when it is open; sufficient to activate a tankless heater. Additionally, when a desired temperature is reached, the valve shuts (closes) and remains shut until a lower preselected temperature is reached. All fluid contacted materials of the valve construction are to be lead free or are combined in such a way that potable approval tests can be met.

In accordance with the present invention there is provided a recirculation valve for use with a tankless water heater in a system that includes hot and cold water fixtures and a cold water supply, said recirculation valve comprising:
 a valve body having an inlet connection, a pair of outlet connections and an internal chamber;
 a thermostatic element that is disposed in a first portion of the internal chamber of the valve body and includes an actuation body that is responsive to water temperature;
 said valve body further having a port opening that is disposed between the thermostatic element and a second portion of the internal chamber;
 said thermostatic element further including a piston constructed and arranged to operatively extend from said actuation body when the actuation body is heated, and a plunger that is carried by and is moveably responsive to the actuation body;
 whereby, when the actuation body is heated, the valve transitions from an open position to a closed position by the piston moving the actuation body and plunger so that the plunger moves to seal against the port opening of the valve body.

In accordance with other aspects of the present invention the pair of outlet connections are disposed either in line or offset from one another forming a tee shaped configuration; one of the pair of outlet connections acts as an inlet if there is a demand for water at the other connection or as an outlet if there is no demand for water at the other connection; further comprising a check valve disposed in said valve body to prevent cold water from entering the hot water supply; including a hot water angle stop, a cold water angle stop and a check valve in one of the hot water angle stop and cold water angle stop to prevent cold water from entering the hot water supply; including a hot water angle stop, a cold water angle stop and a hose that connects the valve body with one of the hot water angle stop and cold water angle stop; including a tee mounted at one of the hot water angle stop and cold water angle stop, said hose connecting the tee with the valve body; including a hot water angle stop and a cold water angle stop, and wherein the valve body is connected at the cold water angle stop; including a hot water angle stop and a cold water angle stop, and wherein the valve body is connected at the hot water angle stop; wherein the pair of outlet connections includes a connection to one of the fixtures and in line therewith a connection to one of the water supplies; wherein the first portion of the internal chamber is elongated supporting the valve body, plunger and piston, wherein the pair of connections are disposed orthogonal to the elongated chamber, and wherein the port opening of the valve body is annular and is disposed between the first and second chamber portions; wherein the plunger is disposed at one end of the actuation body and the piston is disposed at an opposite end of the actuation body; wherein the actuation body has a passage through which the piston moves so as to transition the actuation body toward and away from the port opening; including a spring that is disposed within the internal chamber for biasing the actuation body away from the port opening; including a cap in the valve body against which the piston is urged; and wherein the cap is adjustable as to its longitudinal position in order to adjust the temperature at which the port opening is closed.

In accordance with another embodiment of the present invention there is provided a recirculation system for use with a tankless water heater, said recirculation system comprising:

a hot water fixture, a cold water fixture and a cold water supply;

a recirculation valve that is comprised of a valve body that contains a thermostatically controlled actuation body so that, when the actuation body is heated, the valve transitions from an open position to a closed position;

a T-shaped connection that couples with the tankless water heater, that also connects with the hot water fixture and that has a transverse connection;

a cold water side connection that connects between the cold water fixture and the cold water supply;

said recirculation valve supported at the cold water side connection;

and a hose that connects the valve body with the transverse connection.

In accordance with another aspect of the present invention the recirculation valve also includes a piston constructed and arranged to operatively extend from said actuation body when the actuation body is heated, and a plunger that is carried by and is moveably responsive to the actuation body.

In accordance with still another embodiment of the present invention there is provided a recirculation system for use with a tankless water heater, said recirculation system comprising:

a hot water fixture, a cold water fixture and a cold water supply;

a recirculation valve that is comprised of a valve body that contains a thermostatically controlled actuation body so that, when the actuation body is heated, the valve transitions from an open position to a closed position;

a T-shaped connection that couples with the cold water supply, that also connects with the cold water fixture and that has a transverse connection;

a hot water side connection that connects between the hot water fixture and the tankless water heater;

said recirculation valve supported at the hot water side connection;

and a hose that connects the valve body with the transverse connection.

In accordance with still another aspect of the present invention the recirculation valve also includes a piston constructed and arranged to operatively extend from said actuation body when the actuation body is heated, and a plunger that is carried by and is moveably responsive to the actuation body.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and/or "comprising", when used in this specification, signify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new hot water recirculation valve and system for tankless "On Demand" (On Call) and continuous supply is discussed herein. In the following description, for purposes of explanation, numerous specific details are set forth in order to provide a thorough understanding of the present invention. The present disclosure is to be considered as an exemplification of the invention and is not intended to limit the invention to the specific embodiments illustrated by the figures or description below.

Figure 1:
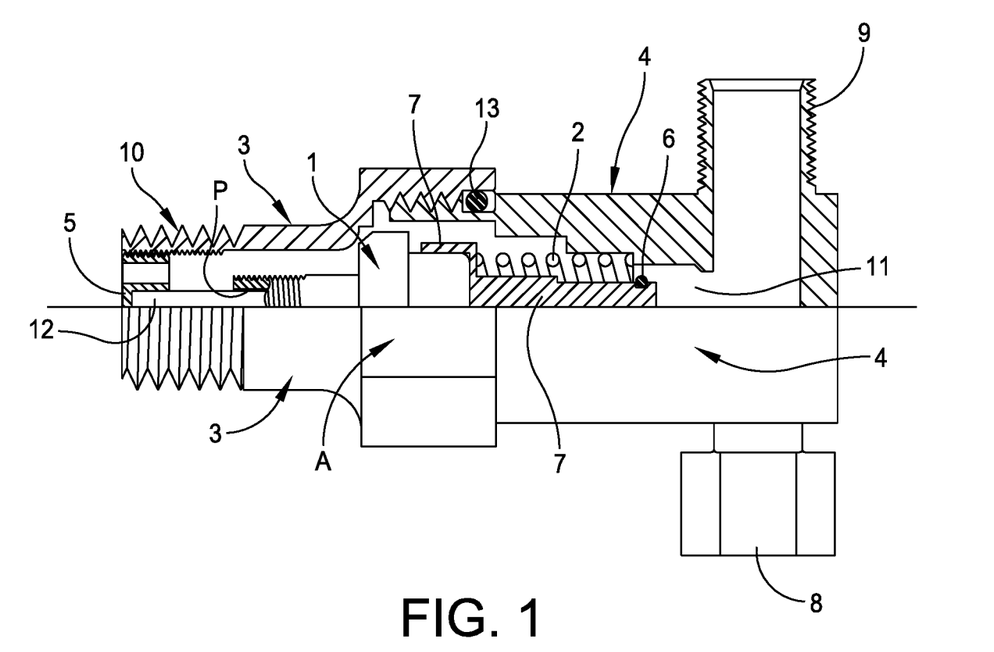
FIG. 1 depicts a sectioned view of one example of a valve according to various embodiments of the present invention.

The present description will now be described by referencing the appended figures representing preferred embodiments. FIG. 1 depicts a sectioned view of the elements that comprise a valve according to various embodiments of the present invention. In preferred embodiments the components of the valve are contained in a cast or otherwise manufactured body made of one or more body members 3, 4 which contain attachments for the angle stop 8 and attachments for respective water inlets and outlets 9, 10. Body members 3, 4 are sealed between body members by means of a sealing element 13 or by other means. The element 13 may be in the form of an O-ring or a gasket.

Figure 3A:
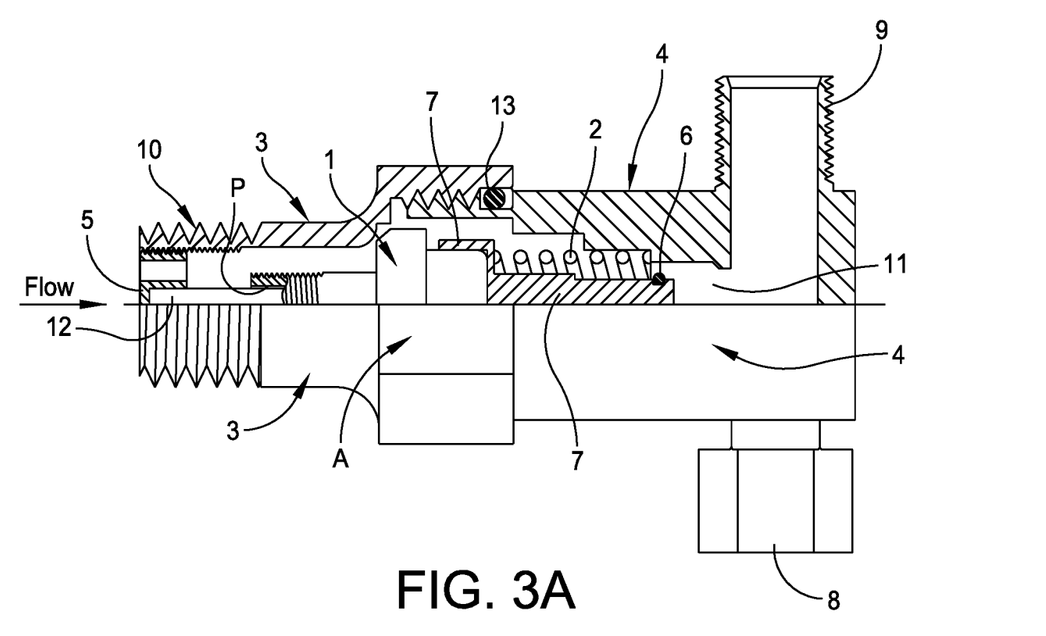
FIG. 3A shows the valve of FIG. 1 in an open position.
Figure 3B:
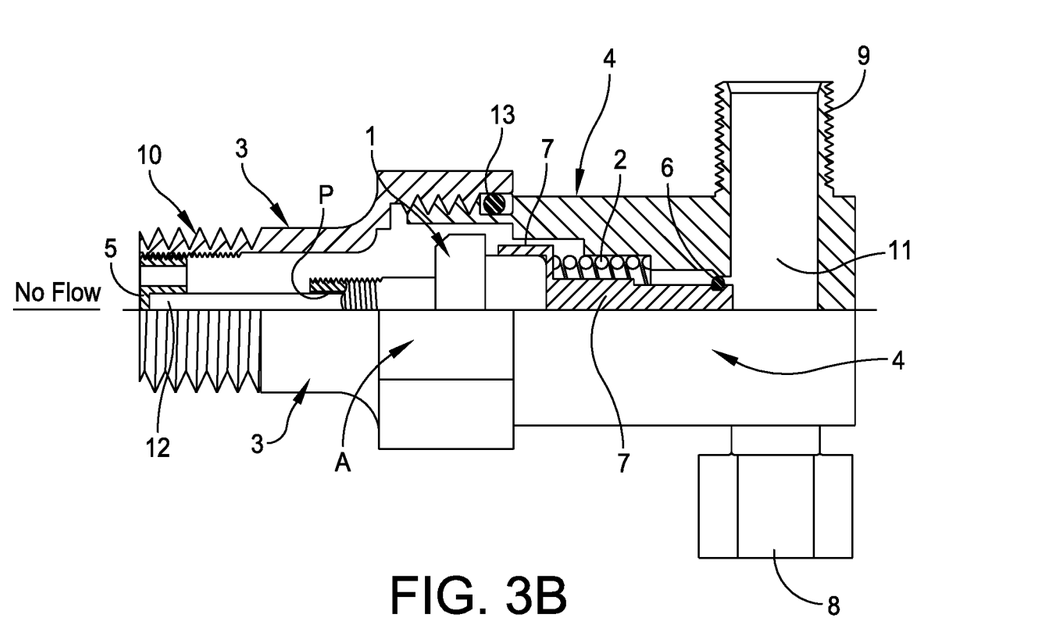
FIG. 3B shows the valve of FIG. 1 in a closed position.

The thermal element 1 is contained within the body members 3, 4 and is positioned in such a way that when acted on by temperature will open and/or close an internal port 11 by means of a plunger 7 which contains a sealing piece 6 or other sealing means such as a gasket or O-ring. The seal 6, as noted in FIGS. 1, 3A and 3B, is disposed at a distal end of the annular plunger 7. A piston 12 is acted on by the thermal element which extends the piston when the thermal element is acted on by a higher temperature. The piston 12 retracts into the thermal element 1 when the thermal element 1 is acted on by lower temperatures and/or through the expansion of the return spring 2. The return spring 2 or other expandable element is mounted in such a way that the plunger 7 follows the movement of the thermal element 1 and causes the piston 12 to retract into the thermal element.

To allow temperature settings to be adjusted an adjustment cap 5 is positioned within the body member 3. When the adjustment cap 5 is threaded further into the body member 3 or if the adjustment cap is threaded further out of the body member 3 the temperature at which the valve closes and the full open temperature of the valve is altered. The cap 5 is constructed and arranged so that water can flow through to the thermostatic element, while at the same time forming an abutment surface for the end of the piston 12. For water flow the cap 5 is provided with one or more passage holes. The abutment with the piston 12 is at a solid area of the cap.

The recirculation valve has a first portion of the internal chamber that is elongated for supporting the valve body A, plunger 7 and piston 12, wherein there are provided a pair of connections that are disposed orthogonal to the elongated chamber, and wherein the port opening 11 of the valve body is annular and is disposed between the first and second chamber portions (either side of the port opening 11). As illustrated in FIG. 1 the plunger 7 is disposed at one end of the actuation body A and the piston 12 is disposed at an opposite end of the actuation body A. The actuation body has a passage P through which the piston moves so as to transition the actuation body toward and away from the port opening 11. See FIG. 1 which shows a cut-away portion illustrating the passage P. See also FIGS. 3A and 3B which show respective positions of the actuation body. In FIG. 3A piston 12 is fully or substantially fully within the body A positioning the valve away from the port opening 11. In FIG. 3B piston 12 is extended relative to the body A so that the plunger 7 transitions to close the valve by closing the plunger 7, particularly the seal 6, at the port opening 11. Thus, the piston is always in contact with the cap 5 but has different positions, as shown in FIGS. 3A and 3B, wherein the valve body moves relative to the piston to those respective positions.

The embodiment shown in FIG. 1 also includes a spring 2 that is disposed within the internal chamber for biasing the actuation body away from the port opening 11. For the purpose of an adjustment for temperature range a cap 5 is used in the valve body against which the piston 12 is urged. The cap 5 is adjustable as to its longitudinal position in order to adjust the temperature at which the port opening 11 is closed. The cap 5 is secured in place within the valve body but can be screwed in or out for providing adjustment. The thermostatic operation is carried out by virtue of an element within the valve body that responds to water temperature to essentially move the valve body relative to the piston, such as to a position shown in FIG. 3B.

Figure 2A:
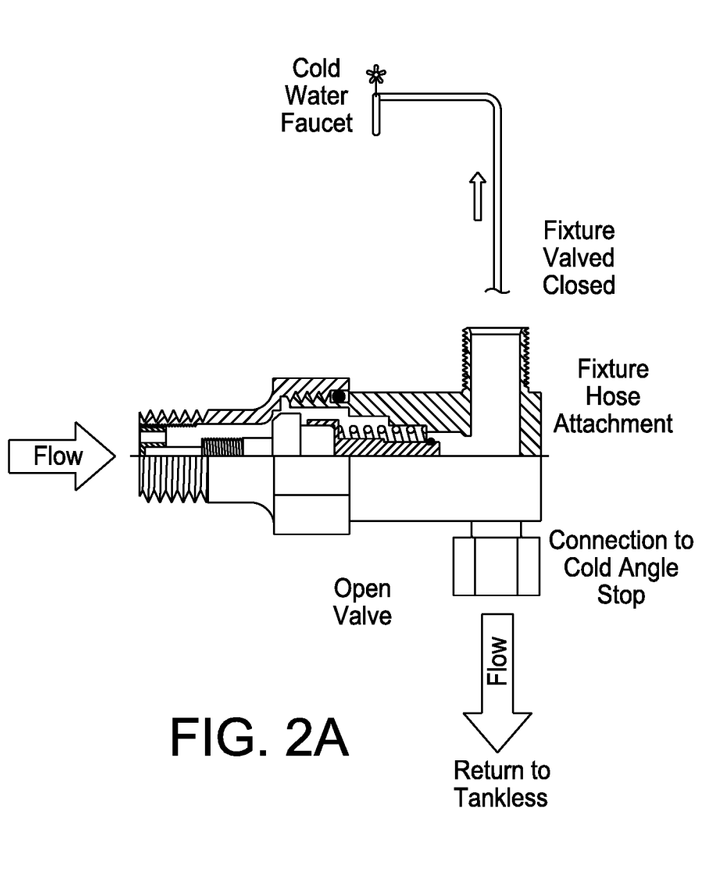
FIGS. 2A & 2B together illustrate the flow direction through the valve according to various embodiments described herein.
Figure 2B:
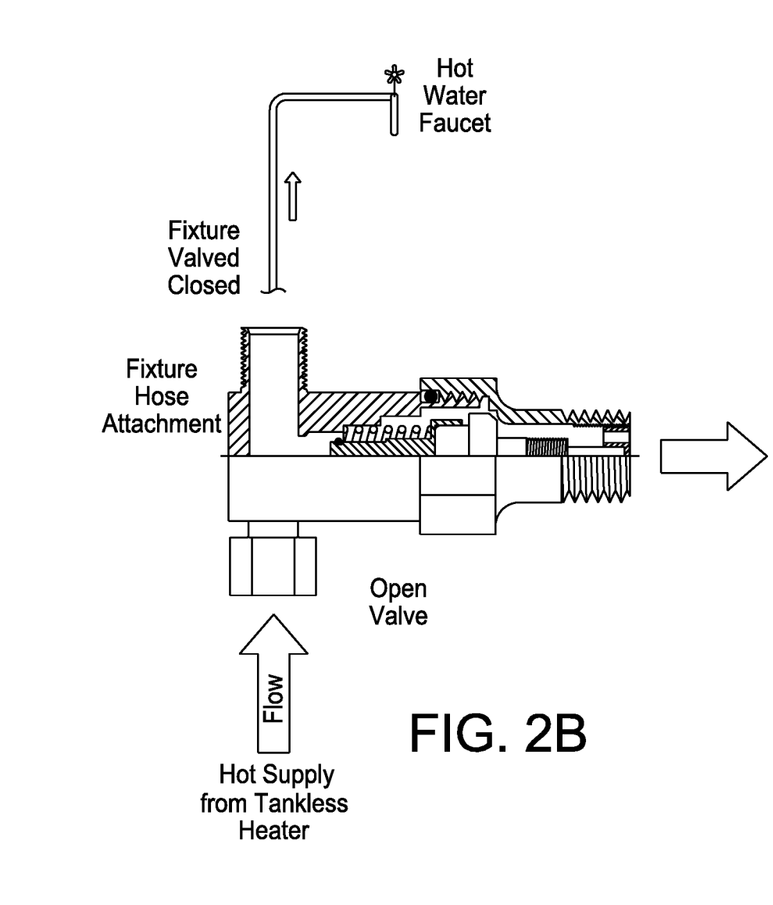

Referring to FIG. 2 the flow path of hot water through the valve with the fixture closed is shown. FIG. 2A illustrates the hot water flow path through the valve if the valve is mounted on the cold water supply angle stop. FIG. 2B illustrates the hot water flow path through the valve if the valve is mounted on the hot water supply angle stop.

Referring to FIG. 3A the valve is shown in an open position which occurs when the water in the valve body is cold. In FIG. 3B the valve is shown in a closed position which occurs when the water in the valve body is hot.

Figure 4:
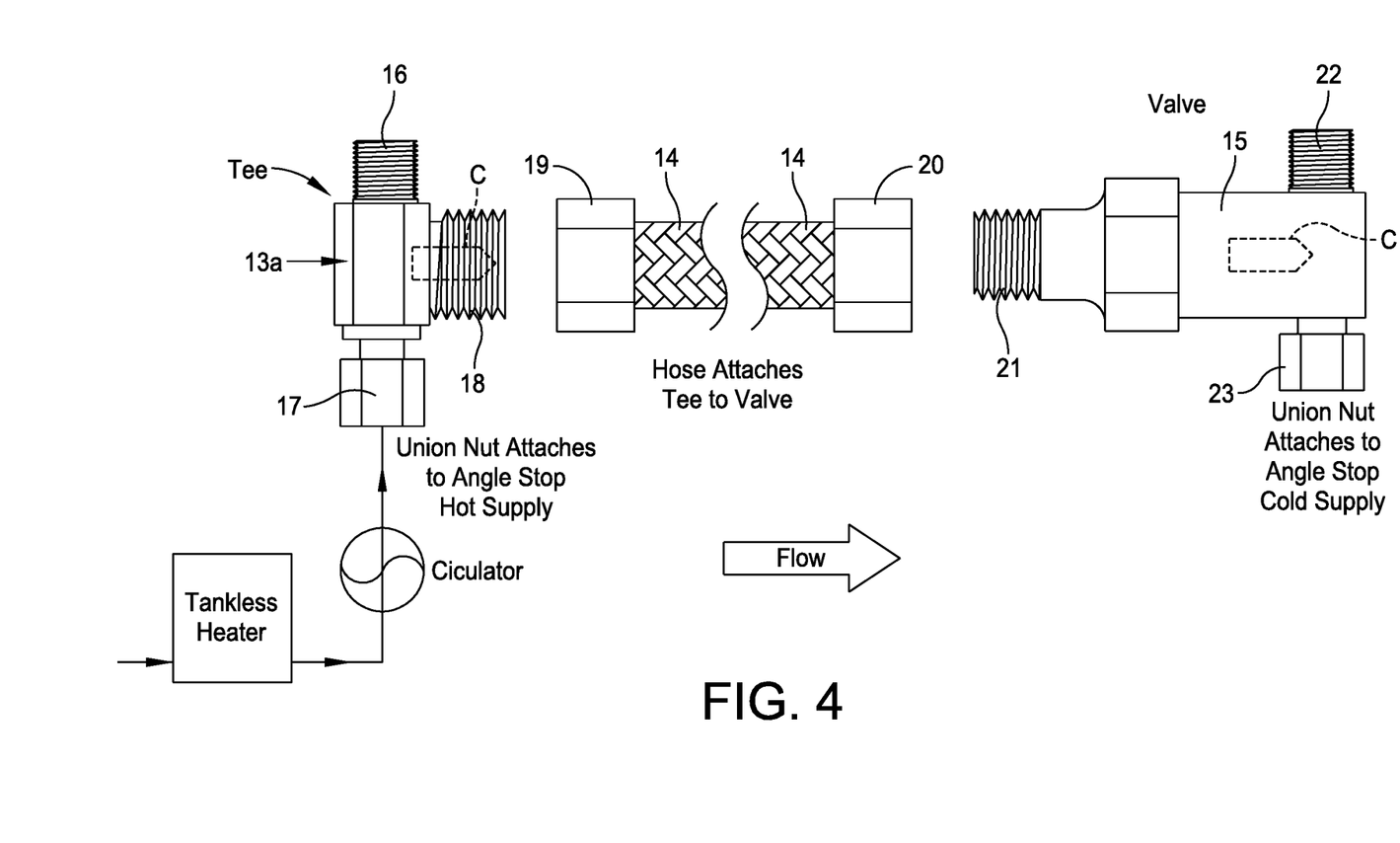
FIG. 4 is a diagram, as an example, of a complete valve system which includes a tee/check valve that attaches to one of the angle stop valves and to one of the fixture supply lines, and a hose attachment to the tee/check valve and the valve which attaches to the other angle stop valve and the other fixture supply line.

Referring to FIG. 4, a complete system is shown as it would appear and be connected in one embodiment. In this embodiment FIG. 4 depicts a system which includes a tee 13 containing a check valve C (depicted in dotted outline) with the tees inlet 17 attached to the discharge of the hot supply angle stop valve and one discharges 16 attached to the hot fixture supply line. The remaining discharge 18 from the tee 13 is shown attached to the inlet 19 of a hose 14. The discharge 20 of the hose 14 is in turn attached to the inlet 21 of the valve. Further, one discharge 23 from the valve is attached to the discharge of the cold supply angle stop valve and the other discharge 22 from the valve is attached to the cold fixture supply line.

Figure 5:
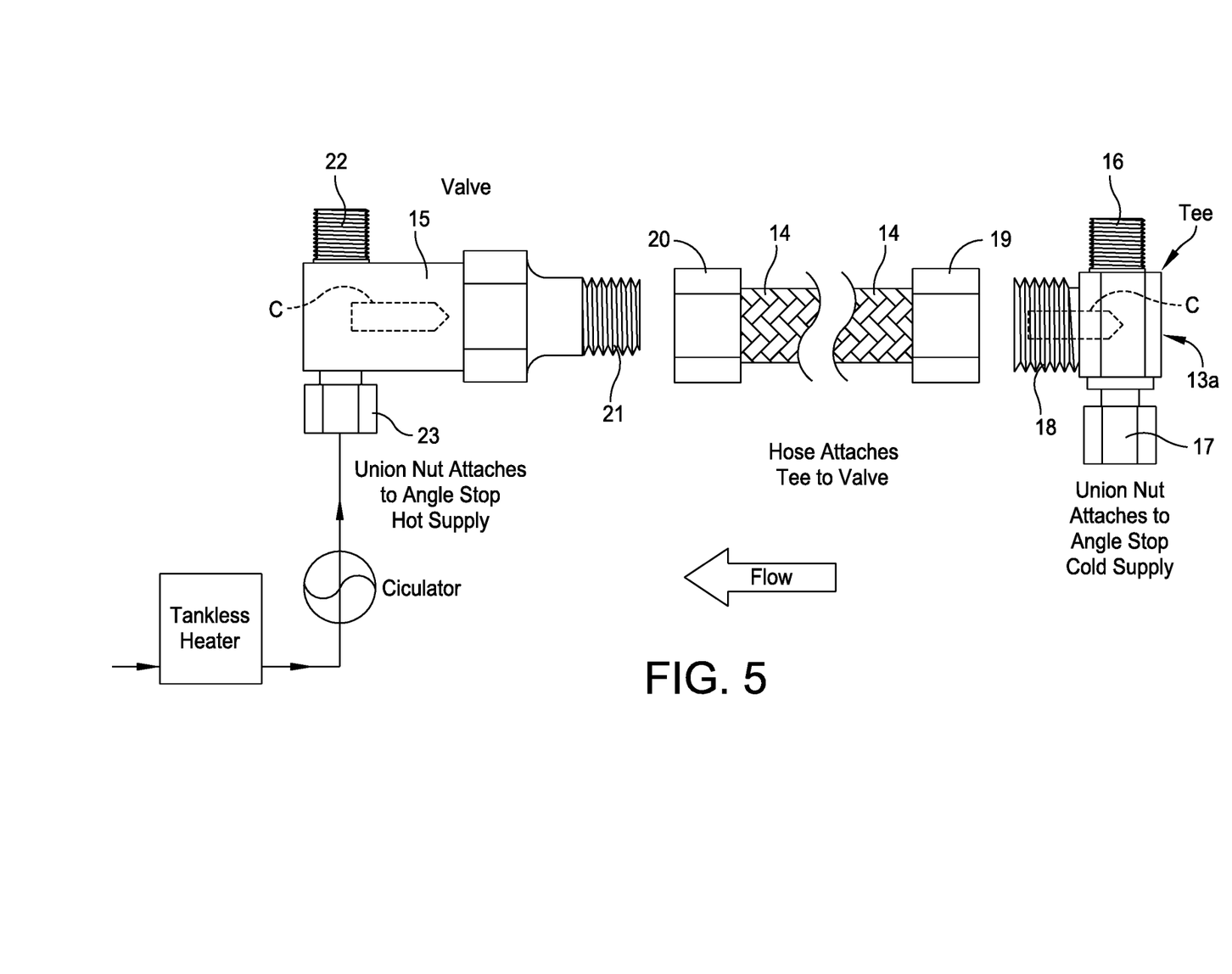
FIG. 5 is a diagram for an alternate arrangement to that shown in FIG. 4.

Referring now to FIG. 5 which illustrates the valve of the present invention connected at the hot water side. In FIG. 5 a complete system is shown as it would appear and be connected in one embodiment. In this embodiment FIG. 5 depicts a system which includes a tee 13 containing a check valve C (depicted in dotted outline) with the tees inlet 17 attached to the discharge of the cold supply angle stop valve and one discharges 16 attached to the cold fixture supply line. The remaining discharge 18 from the tee 13 is shown attached to the inlet 19 of a hose 14. The discharge 20 of the hose 14 is in turn attached to the inlet 21 of the valve. Further, one discharge 23 from the valve is attached to the discharge of the hot supply angle stop valve and the other discharge 22 from the valve is attached to the hot fixture supply line.

In FIGS. 4 and 5 it is noted that the general locations of the check valve C is shown. When the valve arrangement of the present invention is used in conjunction with a check valve, the check valve may be built into the body of the valve or the check valve may be built into an associated fitting so that cold water is kept from entering the hot water supply. Thus in FIGS. 4 and 5, although two check valves are shown usually the system would have only one check valve at either location.

While preferred materials of construction for the elements have not been described, the invention may be constructed of but not limited to metal alloys, plastic, glass, rubber, foam, composites and other materials. These materials may comprise some or all of the elements of the invention.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A recirculation valve for use with a tankless water heater in a system that includes hot and cold water fixtures and a cold water supply, said recirculation valve comprising:
   a valve body having an inlet connection, a pair of outlet connections and an internal chamber;
   a thermostatic element that is disposed in a first portion of the internal chamber of the valve body and includes an actuation body that is responsive to water temperature;
   said valve body further having a port opening that is disposed between the thermostatic element and a second portion of the internal chamber;
   said thermostatic element further including a piston constructed and arranged to operatively extend from said actuation body when the actuation body is heated, and a plunger that is carried by and is moveably responsive to the actuation body;
   whereby, when the actuation body is heated, the valve transitions from an open position to a closed position by the piston moving the actuation body and plunger so that the plunger moves to seal against the port opening of the valve body;
   wherein the pair of outlet connections are disposed either in line or offset from one another forming a tee shaped configuration; and
   wherein one of the pair of outlet connections acts as an inlet if there is a demand for water at the other outlet connection or as an outlet if there is no demand for water at the other outlet connection.

2. A recirculation valve according to claim 1 further comprising a check valve disposed in said valve body to prevent cold water from entering a hot water supply provided from the tankless water heater.

3. A recirculation valve according to claim 1 wherein the pair of outlet connections includes a connection to one of the hot and cold water fixtures and in line therewith a connection to one of the cold water supply and a hot water supply.

4. A recirculation valve according to claim 1 wherein the first portion of the internal chamber is elongated supporting the valve body, plunger and piston, wherein the pair of outlet connections are disposed orthogonal to the elongated chamber, and wherein the port opening of the valve body is annular and is disposed between the first and second chamber portions.

5. A recirculation valve for use with a tankless water heater in system that includes hot and cold water fixtures and a cold water supply, said recirculation valve comprising:
   a valve body having an inlet connection, a pair of outlet connections and an internal chamber;
   a thermostatic element that is disposed in a first portion of the internal chamber of the valve body and includes an actuation body that is responsive to water temperature;
   said valve body further having a port opening that is disposed between the thermostatic element and a second portion of the internal chamber;
   said thermostatic element further including a piston constructed and arranged to operatively extend from said actuation body when the actuation body is heated, and a plunger that is carried by and is moveably responsive for the actuation body;
   whereby, when the actuation body is heated, the valve transitions from an open position to a closed position by the piston moving the actuation body and plunger so that the plunger moves to seal against the port opening of the valve body;
   a tee having an inlet and first and second discharge ports with the tee inlet coupled to the tankless water heater, the first discharge port coupled to the hot water fixture, and a hose that connects the second discharge port to the valve body.

6. A recirculation valve for use with a tankless water heater in a system that includes hot and cold water fixtures and a cold water supply, said recirculation valve comprising:
   a valve body having an inlet connection, a pair of outlet connections and an internal chamber;
   a thermostatic element that is disposed in a first portion of the internal chamber of the valve body and includes an actuation body that is responsive to water temperature;
   said valve body further having a port opening that is disposed between the thermostatic element and a second portion of the internal chamber;
   said thermostatic element further including a piston constructed and arranged to operatively extend from said actuation body when the actuation body is heated, and a plunger that is carried by and is moveably responsive to the actuation body;
   whereby, when the actuation body is heated, the valve transitions from an open position to a closed position by the piston moving the actuation body and plunger so that the plunger moves to seal against the port opening of the valve body;
   wherein the first portion of the internal chamber is elongated supporting the valve body, plunger and piston, wherein the pair of outlet connections are disposed orthogonal to the elongated chamber, wherein the port opening of the valve body is annular and is disposed between the first and second chamber portions; and
   wherein the plunger is disposed at one end of the actuation body and the piston is disposed at an opposite end of the actuation body.

7. A recirculation valve according to claim 6 wherein the actuation body has a passage through which the piston moves so as to transition the actuation body toward and away from the port opening.

8. A recirculation valve according to claim 7 including a spring that is disposed within the internal chamber for biasing the actuation body away from the port opening.

9. A recirculation valve according to claim 8 including a cap in the valve body against which the piston is urged.

10. A recirculation valve according to claim 9 wherein the cap is adjustable as to its longitudinal position in order to adjust the temperature at which the port opening is closed.

* * * * *